United States Patent
Narayanamurthy et al.

(10) Patent No.: US 10,503,548 B2
(45) Date of Patent: Dec. 10, 2019

(54) RESOURCE AND LATENCY ESTIMATION-BASED SCHEDULING IN A DISTRIBUTED COMPUTING ENVIRONMENT

(71) Applicant: Microsoft Technology Licensing, LLC, Redmond, WA (US)

(72) Inventors: Shravan Matthur Narayanamurthy, Sammamish, WA (US); Yan Li, Bellevue, WA (US); Sathiya K. Selvaraj, Morgan Hill, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 221 days.

(21) Appl. No.: 15/290,983

(22) Filed: Oct. 11, 2016

(65) Prior Publication Data
US 2018/0101405 A1    Apr. 12, 2018

(51) Int. Cl.
*G06F 9/48*    (2006.01)

(52) U.S. Cl.
CPC .................. *G06F 9/4887* (2013.01)

(58) Field of Classification Search
CPC ............. G06F 11/3409; G06F 11/3452; G06F 2209/5019
See application file for complete search history.

(56) References Cited

U.S. PATENT DOCUMENTS

| | | | |
|---|---|---|---|
| 8,239,538 B2 | 8/2012 | Zhang et al. | |
| 9,235,442 B2 | 1/2016 | Kampas et al. | |
| 9,344,380 B2 | 5/2016 | Zhu et al. | |
| 9,378,044 B1* | 6/2016 | Gaurav | G06F 9/5077 |
| 2006/0010101 A1* | 1/2006 | Suzuki | G06F 11/3409 |
| 2011/0161973 A1 | 6/2011 | Klots et al. | |
| 2013/0138798 A1 | 5/2013 | Gohad et al. | |
| 2013/0185433 A1* | 7/2013 | Zhu | H04L 67/303 |
| | | | 709/226 |
| 2014/0025610 A1* | 1/2014 | Fox | G06F 7/60 |
| | | | 706/13 |
| 2015/0350108 A1 | 12/2015 | Baughman et al. | |

(Continued)

OTHER PUBLICATIONS

Verma, et al., "Large-Scale Cluster Management at Google with Borg", In Proceedings of the 10th European Conference on Computer Systems, Apr. 21, 2015, 17 Pages.

(Continued)

*Primary Examiner* — Dong U Kim
(74) *Attorney, Agent, or Firm* — Alleman Hall Creasman & Tuttle LLP

(57) ABSTRACT

A time series of metric values indicative of a cost of executing a job may be acquired. The acquired time series may be normalized to form a skyline indicative of costs incurred, over time, during an instance of executing the job. A modelled skyline may be formed by a best-fit analysis of a plurality of metric-based skylines, constrained by penalties for over-allocation and under-allocation. Based on the modelled skyline, the modelled skyline may be aligned with one or more additional modelled skylines to identify execution times for the job. The identified execution times may be selected to minimize risk of exceeding a time-to-complete parameter and avoid under-utilization of resources.

20 Claims, 12 Drawing Sheets

(56) References Cited

U.S. PATENT DOCUMENTS

2018/0006903 A1* 1/2018 Ganguli .............. H04L 41/5009
2018/0101404 A1 4/2018 Narayanamurthy et al.

OTHER PUBLICATIONS

Vinothina, et al., "A Survey on Resource Allocation Strategies in Cloud Computing", In International Journal of Advanced Computer Science and Applications, vol. 3, No. 6, Jun. 2012, pp. 97-104.
"Non Final Office Action issued in U.S. Appl. No. 15/290,948", dated Jun. 1, 2018, 17 Pages.
Augustine, et al., "Strip Packing with Precedence Constraints and Strip Packing with Release Times", In Journal of Theoretical Computer Science, vol. 410, Issues 38-40, Sep. 6, 2009, 12 Pages.
Azar, et al., "The Loss of Serving in the Dark", In Proceedings of the 45th Annual ACM Symposium on Theory of Computing, Jun. 1, 2013, 19 Pages.
Bansal, et al., "Improved Approximation Algorithm for Two-Dimensional Bin Packing", In Proceedings of the 25th Annual ACM-SIAM Symposium on Discrete Algorithms, Jan. 5, 2014, 13 Pages.
Baruah, et al., "Fast Scheduling of Periodic Tasks on Multiple Resources", In Proceedings of the 9th International Parallel Processing Symposium, Apr. 25, 1995, 21 Pages.
Berral, et al., "Aloja: A Framework for Benchmarking and Predictive Analytics in Big Data Deployments", In IEEE Transactions on Emerging Topics in Computing, Issue 99, Oct. 30, 2015, 12 Pages.
Boutin, et al., "Apollo: Scalable and Coordinated Scheduling for Cloud-Scale Computing", In Proceedings of the 11th USENIX Conference on Operating Systems Design and Implementation, Oct. 6, 2014, pp. 285-300.
Chaudhuri, et al., "Self-Tuning Database Systems: A Decade of Progress", In Proceedings of the 33rd International Conference on Very Large Data Bases, Sep. 23, 2007, pp. 3-14.
Youssef, et al., "A Trace-Based Service Level Planning Framework for Enterprise Application Clouds", In Proceedings of the 7th International Conference on Network and Service Management, Oct. 24, 2011, 5 Pages.
Curino, et al., "Reservation-Based Scheduling: If You're Late Don't Blame Us!", In Proceedings of the ACM Symposium on Cloud Computing, Nov. 3, 2014, 14 Pages.
Davis, et al., "A Survey of Hard Real-Time Scheduling for Multi-processor Systems", In Journal of ACM Computing Surveys, vol. 43, Issue 4, Oct. 1, 2011, 41 Pages.
Desai, et al., "Critical Path Based Performance Models for Distributed Queries", In Microsoft Tech-Report: MRS-TR-2012-121, Dec. 7, 2012, 16 Pages.
Do, et al., "Profiling Applications for Virtual Machine Placement in Clouds", In Proceedings of the IEEE 4th International Conference on Cloud Computing, Jul. 4, 2011, pp. 660-667.
Ferguson, et al., "Jockey: Guaranteed Job Latency in Data Parallel Clusters", In Proceedings of the 7th ACM European Conference on Computer Systems, Apr. 10, 2012, pp. 99-112.
Ganapathi, et al., "Predicting Multiple Metrics for Queries: Better Decisions Enabled by Machine Learning", In Proceedings of IEEE 25th International Conference on Data Engineering, Mar. 29, 2009, 12 Pages.
Ganapathi, et al., "Statistics-Driven Workload Modeling for the Cloud", In Proceedings of the IEEE 26th International Conference on Data Engineering Workshops, Mar. 1, 2010, pp. 87-92.
Garg, et al., "Time-Series Analysis on Cloud Infrastructure Metrics"; Retrieved from https://www.oreilly.com/ideas/time-series-analysis-on-cloud-infrastructure-metrics, Apr. 21, 2016, 12 Pages.
Ghodsi, et al., "Dominant Resource Fairness: Fair Allocation of Multiple Resource Types", In Proceedings of the 8th USENIX Conference on Networked Systems Design and Implementation, Mar. 30, 2011, 14 Pages.
Gong, et al., "PAC: Pattern-Driven Application Consolidation for Efficient Cloud Computing", In Proceedings of 18th Annual IEEE/ACM International Symposium on Modeling, Analysis and Simulation of Computer and Telecommunication Systems, Aug. 17, 2010, pp. 24-33.
Gong, et al., "Press: PRedictive Elastic ReSource Scaling for Cloud Systems", In Proceedings of International Conference on Network and Service Management, Oct. 25, 2010, pp. 9-16.
Grandl, et al., "Multi-Resource Packing for Cluster Schedulers", IIn Journal of ACM SIGCOMM Computer Communication Review, vol. 44, Issue 4, Aug. 17, 2014, pp. 455-466.
Harren, et al., "Improved Lower Bound for Online Strip Packing", In Journal of Theory of Computing Systems, vol. 56, Issue 1, Jan. 1, 2015, pp. 41-72.
Herodotou, et al., "Starfish: A Self-Tuning System for Big Data Analytics", In Proceedings of 5th Biennial Conference on Innovative Data Systems Research, Jan. 9, 2011, 12 Pages.
Hindman, et al., "Mesos: A Platform for Fine-Grained Resource Sharing in the Data Center", In Proceedings of 8th USENIX Conference on Networked Systems Design and Implementation, vol. 11, No. 2011, Mar. 30, 2011, 14 Pages.
Idrissi, et al., "Skyline in Cloud Computing", In Journal of Theoretical and Applied Information Technology, vol. 60, No. 3, Feb. 28, 2014, pp. 637-648.
Isard, et al., "Quincy: Fair Scheduling for Distributed Computing Clusters", In Proceedings of the ACM SIGOPS 22nd Symposium on Operating Systems Principles, Oct. 11, 2009, pp. 261-276.
Isci, et al., "Runtime Demand Estimation for Effective Dynamic Resource Management", In Proceedings of IEEE Network Operations and Management Symposium, Apr. 19, 2010, pp. 381-388.
Jalaparti, et al., "Network-Aware Scheduling for Data-Parallel Jobs: Plan When You Can", In Proceedings of the ACM Conference on Special Interest Group on Data Communication, Aug. 17, 2015, pp. 407-420.
Jyothi, et al., "Morpheus: Towards Automated SLOs for Enterprise Clusters", In Proceedings of the 12th USENIX Conference on Operating Systems Design and Implementation, Nov. 2, 2016, 18 Pages.
Zhang, et al., "Service Workload Patterns for Qos-Driven Cloud Resource management", In Journal of Cloud Computing: Advances, Systems and Applications, vol. 4, Issue 23, Dec. 15, 2015, 21 Pages.
Lama, et al., "Aroma: Automated Resource Allocation and Configuration of MapReduce Environment in the Cloud", In Proceedings of the 9th International Conference on Autonomic Computing, Sep. 18, 2012, 10 Pages.
Lee, et al., "Operator and Query Progress Estimation in Microsoft SQL Server Live Query Statistics", In Proceedings of the ACM SIGMOD International Conference on Management of Data, Jun. 26, 2016, 12 Pages.
Lenstra, et al., "Approximation Algorithms for Scheduling Unrelated Parallel Machines", In Journal of Mathematical Programming, vol. 46, Issue 3, Jan. 1, 1990, pp. 259-271.
Li, et al., "An Extensible Framework for Predictive Analytics on Cost and Performance in the Cloud", In Proceedings of International Conference on Cloud Computing and Big Data, Nov. 4, 2015, pp. 13-20.
Mohamaddiah, et al., "A Survey on Resource Allocation and Monitoring in Cloud Computing", In International Journal of Machine Learning and Computing, vol. 4, No. 1, Feb. 1, 2014, pp. 31-38.
Morton, et al., "Estimating the Progress of MapReduce Pipelines", In Proceedings of the 26th IEEE International Conference on Data Engineering, Mar. 1, 2010, 4 Pages.
Morton, et al., "ParaTimer: A Progress Indicator for MapReduce DAGs", In Proceedings of the ACM SIGMOD International Conference on Management of Data, Jun. 6, 2010, 12 Pages.
Ortiz, et al., "Changing the Face of Database Cloud Services with Personalized Service Level Agreements", In Proceedings of the 7th Biennial Conference on Innovative Data Systems Research, Jan. 4, 2015, 13 Pages.
Popescu, et al., "PREDict: Towards Predicting the Runtime of Large Scale Iterative Analytics", In Proceedings of the Very Large Data Base Endowment, Sep. 1, 2013, 12 Pages.
Rasley, et al., "Efficient Queue Management for Cluster Scheduling", In Proceedings of the 11th European Conference on Computer Systems, Apr. 18, 2016, 15 Pages.

(56) References Cited

OTHER PUBLICATIONS

Sadjadi, et al., "A Modeling Approach for Estimating Execution Time of Long-Running Scientific Applications", In Proceedings of 22nd IEEE International Symposium on Parallel and Distributed Processing, Apr. 14, 2008, 8 Pages.

Schwarzkopf, et al., "Omega: Flexible, Scalable Schedulers for Large Compute Clusters", In Proceedings of the 8th ACM European Conference on Computer Systems, Apr. 15, 2013, pp. 351-364.

Venkataraman, et al., "Ernest: Efficient Performance Prediction for Large-Scale Advanced Analytics", In Proceedings of the 13th USENIX Symposium on Networked Systems Design and Implementation, Mar. 16, 2016, pp. 363-378.

Verboven, et al., "Runtime Prediction Based Grid Scheduling of Parameter Sweep Jobs", In Proceedings of the IEEE Asia-Pacific Services Computing Conference, Dec. 9, 2008, 6 Pages.

Verma, et al., "Aria: Automatic Resource Inference and Allocation for MapReduce Environments", In Proceedings of the 8th ACM International Conference on Autonomic Computing, Jun. 14, 2011, 10 Pages.

"The Apache Software Foundation", Retrieved from http://hadoop.apache.org/docs/current/hadoop-gridmix/GridMix.html, Aug. 30, 2016, 7 Pages.

"Tpc-h Benchmark Specification", Retrieved from http://www.tcp.org/hspec.html, 2008, 3 Pages.

Vavilapalli, et al., "Apache Hadoop YARN: Yet Another Resource Negotiator", In Proceedings of the 4th Annual Symposium on Cloud Computing, vol. 5; Oct. 1, 2013, 16 Pages.

Tumanov, et al., "TetriSched: Global Rescheduling with Adaptive Plan-Ahead in Dynamic Heterogeneous Clusters", In Proceedings of the 11th European Conference on Computer Systems, Apr. 18, 2016, 16 Pages.

Krishnaswamy, et al., "Estimating Computation Times of Data-Intensive Applications", In Journal of IEEE Distributed Systems Online, vol. 5, Issue 4, Apr. 2004, 12 Pages.

Cherkasova, Ludmila, "Performance Modeling in MapReduce Environments: Challenges and Opportunities", In Proceedings of the 2nd ACM/SPEC International Conference on Performance Engineering, Mar. 14, 2011, 1 Page.

Spillner, et al., "Dynamic SLA Template Adjustments Based on Service Property Monitoring", In Proceedings of the IEEE International Conference on Cloud Computing, Sep. 21, 2009, pp. 183-189.

Shimizu, et al., "Platform-Independent Modeling and Prediction of Application Resource Usage Characteristics", In Journal of Systems and Software, vol. 82, Issue 12, Dec. 1, 2009, 1 Page.

Zhang, et al., "Automated Profiling and Resource Management of Pig Programs for Meeting Service Level Objectives", In Proceedings of the 9th International Conference on Autonomic Computing, Sep. 18, 2012, 12 Pages.

Sonmez, et al., "Trace-Based Evaluation of Job Runtime and Queue Wait Time Predictions in Grids", In Proceedings of the 18th ACM International Symposium on High Performance Distributed Computing, Jun. 11, 2009, pp. 111-120.

Zaharia, et al., "Delay Scheduling: A Simple Technique for Achieving Locality and Fairness in Cluster Scheduling", In Proceedings of the ACM European Conference on Computer Systems, Apr. 13, 2010, 14 Pages.

Srinivasan, et al., "Deadline-Based Scheduling of Periodic Task Systems on Multiprocessors", In Journal of Information Processing Letters, vol. 84, Issue 2, Oct. 31, 2002, pp. 93-98.

\* cited by examiner

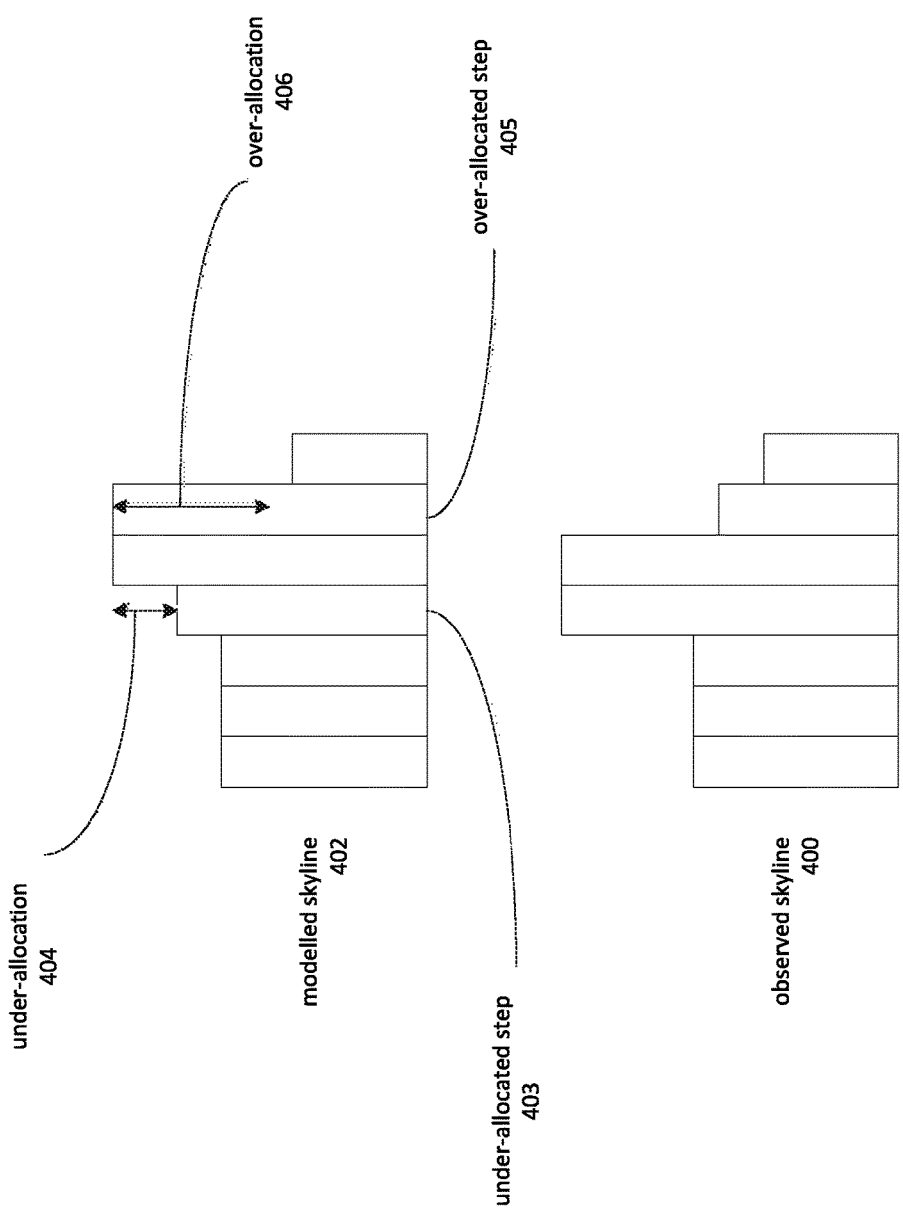

RESOURCE AND LATENCY ESTIMATION-BASED SCHEDULING IN A DISTRIBUTED COMPUTING ENVIRONMENT

TECHNICAL FIELD

This disclosure relates generally to scheduling repeating or recurring computing jobs on computing devices and distributed systems.

BACKGROUND

A pervasive issue in computing technology involves scheduling jobs for execution in a manner that effectively utilizes available resources. These issues may arise, for example, in distributed computing systems where jobs are assigned for periodic execution on selected nodes in a computing cluster. A node may be selected to execute a job based on the node's current and predicted workload, such that executing the job on the selected node is not predicted to cause the selected node to become overloaded. At the same time, efficiently utilizing the node of the cluster may involve attempting to ensure that the nodes are not under-utilized.

SUMMARY

A job scheduling system may comprise one or more modules that acquire a time series of metric values during an instance of executing a job and normalize the acquired time series to form a metric-based skyline indicative of the costs incurred, over time, during the instance of execution. The job scheduling system may further comprise one or more modules that form a modelled skyline based on a best-fit analysis of a plurality of metric-based skylines. The best-fit analysis may comprise solving a linear programming problem with constraints associated with over-allocation and under-allocation penalties. Based on the modelled skyline, the job scheduling system may align the modelled skyline with one or more additional modelled skylines to identify execution times for the job that minimize risk of exceeding a time-to-complete parameter and avoids under-utilization of the available resources.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present disclosure will be described more fully hereinafter with reference to the accompanying drawings, in which:

FIG. 4 depicts an example of over-allocation and under-allocation penalties for a candidate modelled skyline.

DETAILED DESCRIPTION OF ILLUSTRATIVE EMBODIMENTS

Figure 1:
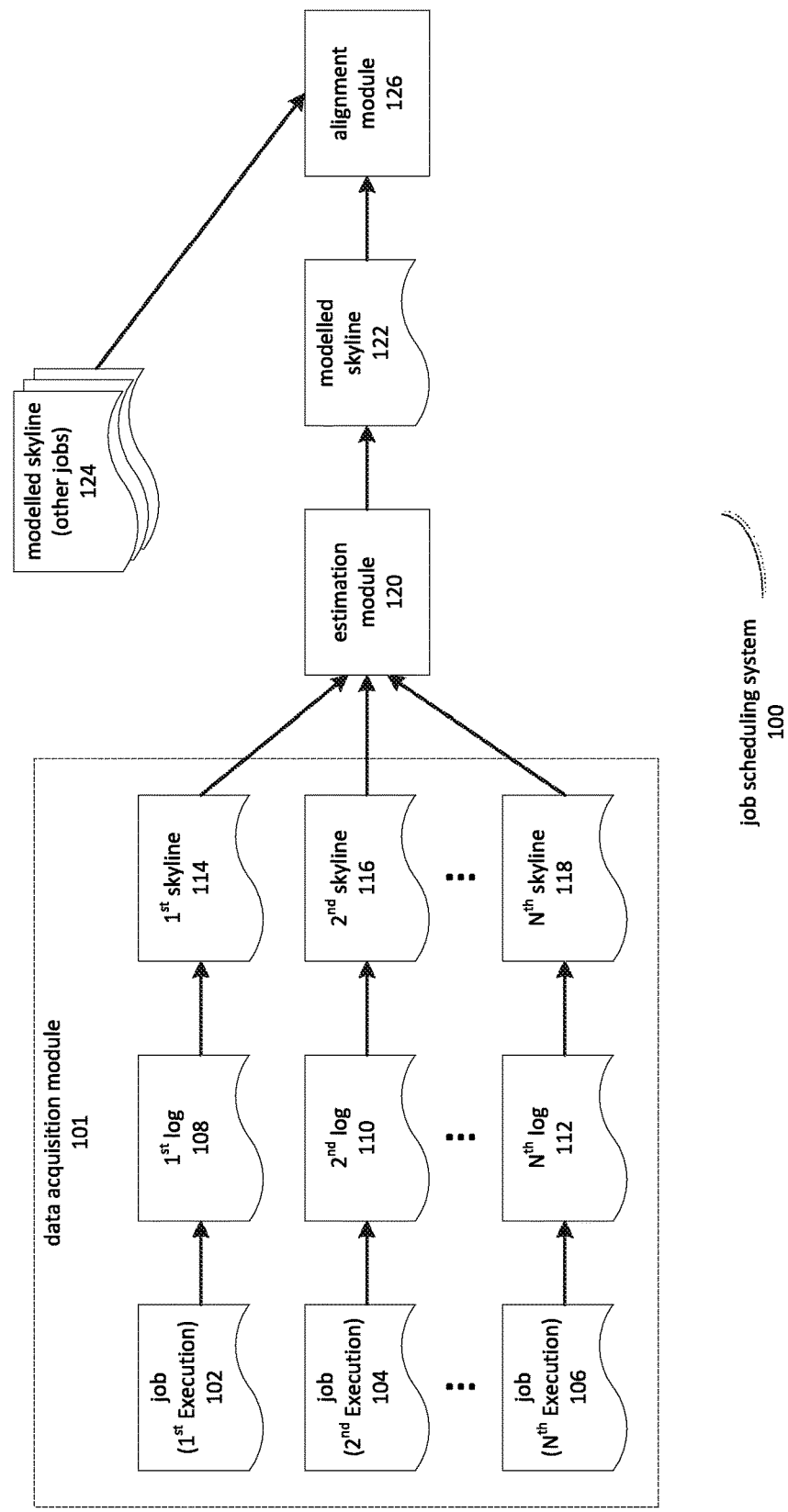
FIG. 1 depicts a job scheduling system.

A job scheduling system may comprise one or more modules that acquire a time series of metric values during an instance of executing of a job and normalize the acquired time series to form a metric-based skyline indicative of the costs incurred, over time, during the instance of execution. The job scheduling system may further comprise one or more modules that form a modelled skyline based on a best-fit analysis of a plurality of metric-based skylines. The best-fit analysis may comprise solving a linear programming problem with constraints associated with over-allocation and under-allocation penalties. Based on the modelled skyline, the job scheduling system may align the modelled skyline with one or more additional modelled skylines to identify execution times for the job. The scheduled execution times may minimize the risk of exceeding a time-to-complete constraint and avoid under-utilization of the available resources.

A job may refer to a computing task that may be performed on an individual computing system or on a distributed computing system. A job may, for example, comprise executing a function, invoking a callback function, executing a program thread for a period of time, and so on.

Scheduling may refer to identifying a time for executing a job. Computing systems may typically execute many jobs simultaneously, such that at any given time the resources available to execute a given job may vary. For example, a simplified view of a computing device might view the availability of a central processing unit ("CPU") as determining whether or not a job may make progress towards completion. If a first job, for example, were consuming 100% of available CPU time, a second job would not progress towards completion until CPU utilization by the first job dropped below 100%. The second job might then begin to consume CPU time that the first job might need to progress. The time needed to complete execution of either job might therefore be subject to considerable variance.

There may be cases where a service-level agreement ("SLA") requires that a job be completed within a certain window of time. In some instances, the SLA may be related to a contract for the provision of computing services. In other instances, the SLA may be imposed as a design constraint.

Scheduling jobs may therefore involve identifying times for executing jobs that may compete for available computing resources. The scheduling may be done to minimize certain factors while maximizing others. For example, while under-utilizing a CPU may decrease the risk of violating an SLA, it might also promote waste or inefficiency. Consequently, jobs might be scheduled so as to minimize the risk of violating an SLA while also maximizing usage of the CPU.

In various embodiments, jobs whose execution is repeated—such as jobs which execute periodically—may be modelled as a time-series of a cost metric. A resource-utilization cost may refer to a metric, such as CPU utilization, that is indicative of a resource used to execute a job. Typically, a cost metric may be a constraining factor with respect to the execution of the job. Non-limiting examples of a resource utilization costs therefore include CPU utilization, memory utilization, network bandwidth, storage capacity, input/output bandwidth, and so on.

A time series of resource utilization costs may be referred to and/or represented as a skyline because, when viewed as a graph, the time series may in some cases appear similar to a city skyline. The time series may also be referred to and/or represented as a step function or staircase function in which the value of the cost varies over time in step-wise or stair-wise fashion. Note that as used herein, the terms time series, skyline, step function, and staircase function refer to cases where there are at least two, non-equal data points.

FIG. 1 depicts a job scheduling system. In the example of FIG. 1, a job scheduling system 100 may comprise a data acquisition module 101, an estimation module 120, and an alignment module 126. The modules of the job scheduling system 100 may, collectively, identify times for executing jobs, and may also, in certain cases, identify resources (such as processors or servers) on which to execute a job.

The data acquisition module 101 may acquire job execution information corresponding to a cost metric. As depicted by FIG. 1, periodic executions of a job 102-106 may result in the collection of a number of corresponding logs 108-112, from which the corresponding skylines 114-118 may be obtained. Note that, as depicted in FIG. 1, the job executions 102-106 correspond to periodic or otherwise repeated execution of the same job.

Each of the logs 108-112 may correspond to a particular execution of a job 102-106. For example, a first execution of a job 102 at time $T_1$ may correspond to a first log 108. Entries in the first log may contain data indicative of cost metrics, such as CPU utilization, at a time relative to the first execution's 102 starting time of $T_1$. Similarly, the entries in a second log 110 may correspond to CPU utilization at a time relative to the second execution's 104 starting time of $T_2$.

The data acquisition module 101 may parse or otherwise analyze the logs 108-112 to obtain the cost metric information. The parsing or other analysis may comprise identifying entries which contain relevant metrics and extracting tuples of information comprising metrics and corresponding time values.

The data acquisition module 101 may form the skylines 114-118 from the extracted data. Each of the skylines 114-118 may correspond to a time series of a cost metric over a period of time that corresponds to one of the job executions 102-106. Each of the skylines 114-118 may be normalized, by the data acquisition module 101, with respect to starting time and time period. For example, each of the skylines 114-118, may be normalized to begin at a time $T_0=0$ and to have each "building" in the skyline representing a uniform period of time.

The estimation module 120 may analyze the skylines 114-118 to produce a model indicative of the job's utilization of the cost metric. The modelled time series, which may also be described or referred to as a modelled skyline, a step function, or a staircase function, may be determined by the estimation module 120. The estimation module 120 may, for example, perform a best-fit analysis of the normalized skylines 114-118. The best-fit analysis may, for example, be obtained by solving a linear programming problem using penalties for over-allocation and/or under-allocation of the cost metric. The solution may, by using appropriate penalties for over-allocation and under-allocation, arrive at a suitable balance between the risk of violating an SLA or under-utilizing available resources.

The alignment module 126 may use the resulting modelled skyline 122, as well as modelled skylines 124 for other jobs, to schedule additional executions of the job. This process may be described as involving aligning execution of the modelled skyline 122 with the additional modelled skylines 124 for other jobs. This may comprise determining times for executing the various jobs in relation to each other, so that predicted utilization of the cost metric remains within acceptable bounds. The alignment process may be constrained by penalties for over-allocation and under-allocation. The alignment module 126 may comprise application of a "packing" algorithm or heuristic to determine a suitable schedule for executing the jobs.

Figure 2:
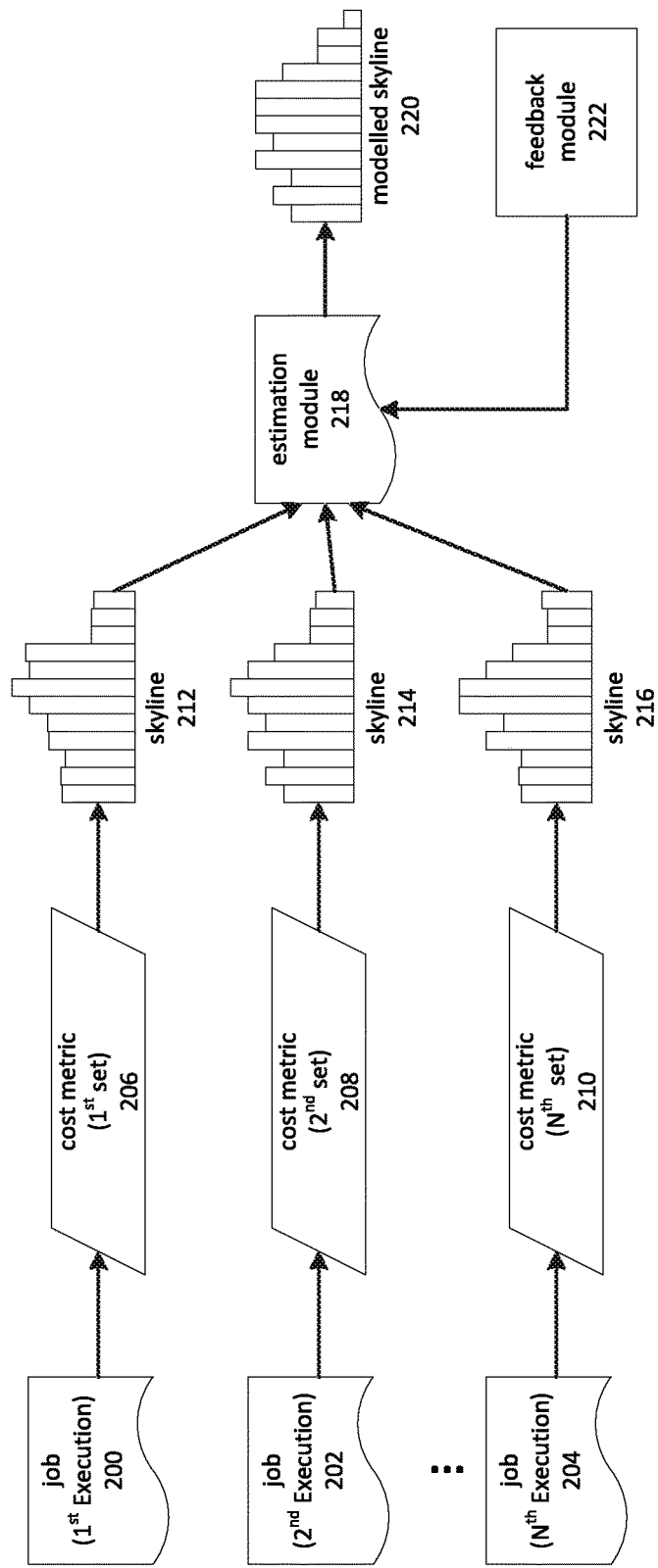
FIG. 2 depicts formation of a modelled skyline.

The operation of the estimation module 120 may be further understood in view of FIG. 2, which is a diagram depicting formation of a modelled skyline. In FIG. 2, a set of job executions 200-204 may correspond to periodic or otherwise repeated executions of a job. Each of these executions 200-204 may be monitored to produce a set of cost metrics 206-210. Each set of cost metrics 206-210 may be a time series of resource utilization measures, such as CPU utilization, memory utilization, network bandwidth, and so on. Each set of costs-metrics 206-210, i.e. each time series, may be normalized to form a corresponding skyline 212-216.

The estimation module 218 may analyze the skylines 212-216 to form a modelled skyline 220. The modelled skyline 220 may be obtained by a best-fit analysis of the skylines 212-216, subject to penalties for over-allocation and under-allocation.

The modelled skyline 220 may represent a resource cost allocation that has fidelity to the requirements of the periodic or repeating executions 200-204 of a job. The modelled skyline 220 may be based on the solution to a linear programming problem that determines a best-fitting step function that is representative of the collection of skylines 212-216 corresponding to the periodic or repeating executions 200-204. The optimization underlying the linear programming problem may involve parameters indicative of over-allocation and under-allocation penalties. In an embodiment, a parameter $\alpha$ may represent over-allocation and under-allocation penalties, where $\alpha=1$ corresponds to maximal reduction of over-allocation and $\alpha=0$ corresponds to maximal reduction of under-allocation.

The over-allocation penalty may be an average, instantaneous over-allocation. The under-allocation penalty may be a penalty which captures the eventual under-allocation of resources. The under-allocation penalty may thus be calculated with respect to a debt accumulated at each under-allocated step and offset by subsequent allocation or over-allocation. The under-allocation debt may be constrained to not fall below zero. In other words, credit for allocation or over-allocation may not be accumulated to offset subsequent under-allocation debt.

The linear programming problem may also include a regularization constraint to prevent solutions that lazily under-allocate initially and subsequently compensate by aggressively over-allocating near the end of the job's solution. The regularization constraint may, for example, constrain the average instantaneous under-allocation to below a threshold value.

The operating conditions in which jobs execute may evolve over time. For example, in various examples involving jobs that perform data processing operations, the quantity of data processed may increase or decrease over time. As the quantity of data changes, previously formed models may become inaccurate.

The feedback module 222 may collect information indicative of the accuracy of the existing modules. For example, metrics may be collected during the scheduled execution of a job, and then compared to the modelled skyline(s) that were the impetus for the determined schedule. When inaccuracy rises above some threshold level, the feedback module 222 may trigger a reforming of the modelled skyline 220 and of schedules based on the modelled skyline.

The feedback module 222 may also account for certain jobs whose execution costs and execution times may be variable. Ongoing deviations in a jobs resource-utilization costs, as well as its time-to-finish, may trigger adjustments to the formation of the modelled skyline 220 by the estimation module 218.

Figure 3:
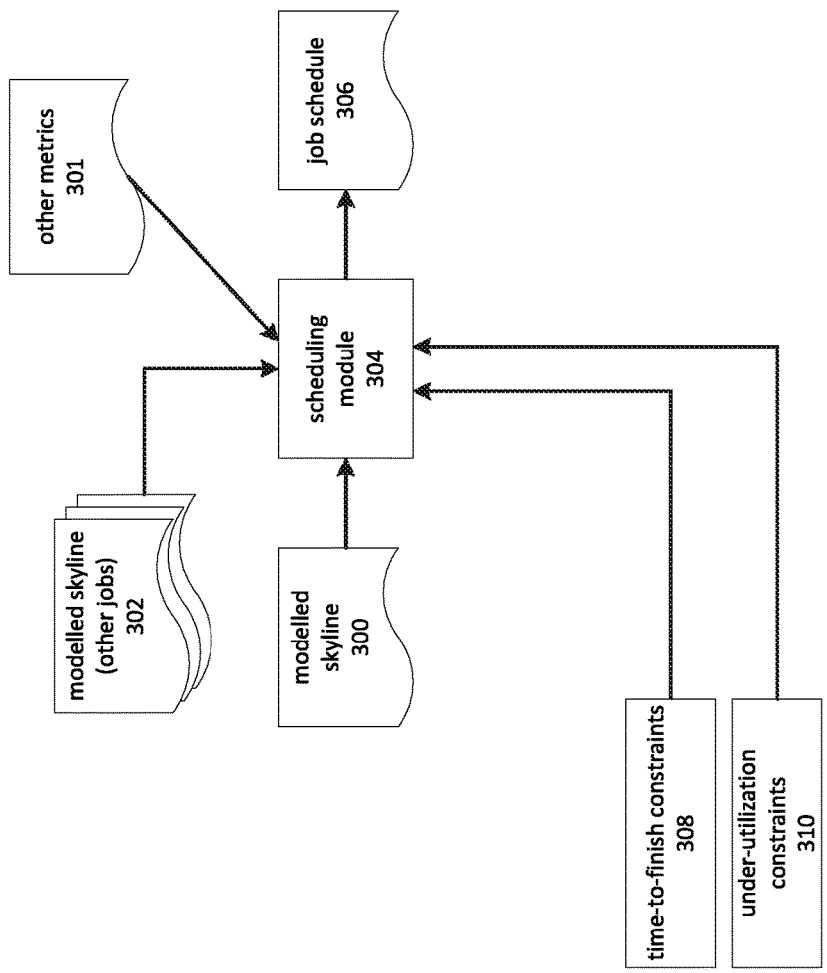
FIG. 3 depicts alignment of job schedules using modelled skylines.

The operation of the alignment module 126 may be further understood in view of FIG. 3, which depicts alignment of job schedules using modelled skylines. As may be seen in the example of FIG. 3, a scheduling module 304 may identify a job schedule 306. The job schedule 306 may identify one or more times for executing a job. The times may, for example, identify times for periodically executing a recurring job, or identify a time for executing a non-recurring job. The scheduling module 304 may identify execution times in view of a modelled skyline 300 corresponding to the job that is to be scheduled, in view of modelled skylines 302 for other jobs, and in view of other metrics 301. The other metrics 301 may, for example, comprise prior usage information and predictions of usage information not based on the modelled skylines 300 and 302.

The scheduling module 304 may base scheduling on constraints, including time-to-finish constraints 308 and under-utilization constraints 310. The time-to-finish constraints 308 may relate to a SLA involving job completion time or job runtime length. For example, the time-to-finish constraints 308 may be used by the scheduling module 304 to evaluate candidate job schedules and to arrive at a selected job schedule 306 based on minimizing risk of exceeding a time-to-finish constraint 308.

The under-utilization constraints 310 may pertain to resource-utilization costs. For example, reserved capacity may be charged on a per-unit basis, such as a charge of C per units of CPU utilization per units of time. The scheduling performed by the scheduling module 304 may be described as reserving resources for the execution of jobs. The reservations may be based on identifying job schedules that conform, to the extent possible, to both time-to-finish constraints 308 and under-utilization constraints 310. These constraints may generally be at odds, since the risk of exceeding time-to-finish constraints 308 may be at a minimum when a maximum amount of resources are reserved. The under-utilization constraints 310 may also be viewed as cost constraints, in the monetary sense, because under-utilized resources are typically less cost-efficient.

The alignment operations of the scheduling module 304, which may sometimes be referred to as packing operations, may be performed using an algorithm or heuristic that minimizes a cost function over the steps of the modelled skyline 300. For example, a cost C(t) may be defined to represent the total cost used at a time t. Jobs may be successively allocated, i.e. aligned, so as to minimize C(t) over each step of the modelled skyline 300. The alignment or packing operation may iteratively place skylines at cost efficient positions. For example, the alignment or packing operations may comprise allocating in stages. The stages may be allocated in reverse chronological order. Each stage may be associated with a time interval in the aligned schedule in which the stage may be allocated. The length of the time interval may be proportional to the ratio between the modelled cost of the stage and the total demand of the remaining stages. Note that in some cases, the alignment process may permit discontinuous allocations for a given job, subject to time-to-finish constraints. In other cases, the alignment process may cause allocations for a given job to be continuous.

The skyline modelling and scheduling operations of the job scheduling system 100 may be further understood in view of FIGS. 4 and 5.

FIG. 4 depicts over-allocation and under-allocation penalties for a candidate modelled skyline. An observed skyline 400 may, for example, have been formed by the data acquisition module 101 of FIG. 1. The observed skyline may be normalized, with respect to other skylines, to have a common start time and to have steps in the skyline correspond to uniform time periods.

A modelled skyline 402 may be an approximation of the observed skyline 400. The modelled skyline 402 may be based on a best-fit approximation of the observed skyline 400 and one or more additional observed skylines, which are not depicted in FIG. 4 in order to focus the diagram on the depiction of over-allocation and under-allocation penalties. The over-allocation and under-allocation penalties for these additional skylines may be calculated using a process similar to what is described here regarding observed skyline 400.

The observed skyline 400 may represent observed usage of a cost metric over a period of time coincident with the execution of a job. The observed skyline 400 and the modelled skyline 402 may have a common start time and common time periods between steps. Similar to the observed skyline 400, the modelled skyline 402 represents a predicted usage of the cost metric over a time period that is coincident with a future execution of the job.

As may be seen by comparing the modelled skyline 402 with the observed skyline 400, there are steps or "buildings" in the modelled skyline 402 that are either taller or shorter than the corresponding step or building in the observed skyline. For example, a step 403 of the modelled skyline 402 may have a corresponding under-allocation 404 compared to the corresponding step in the observed skyline 400. Similarly, a step 405 may have a corresponding over-allocation 406 compared to the corresponding step in the observed skyline 400.

Figure 5A:
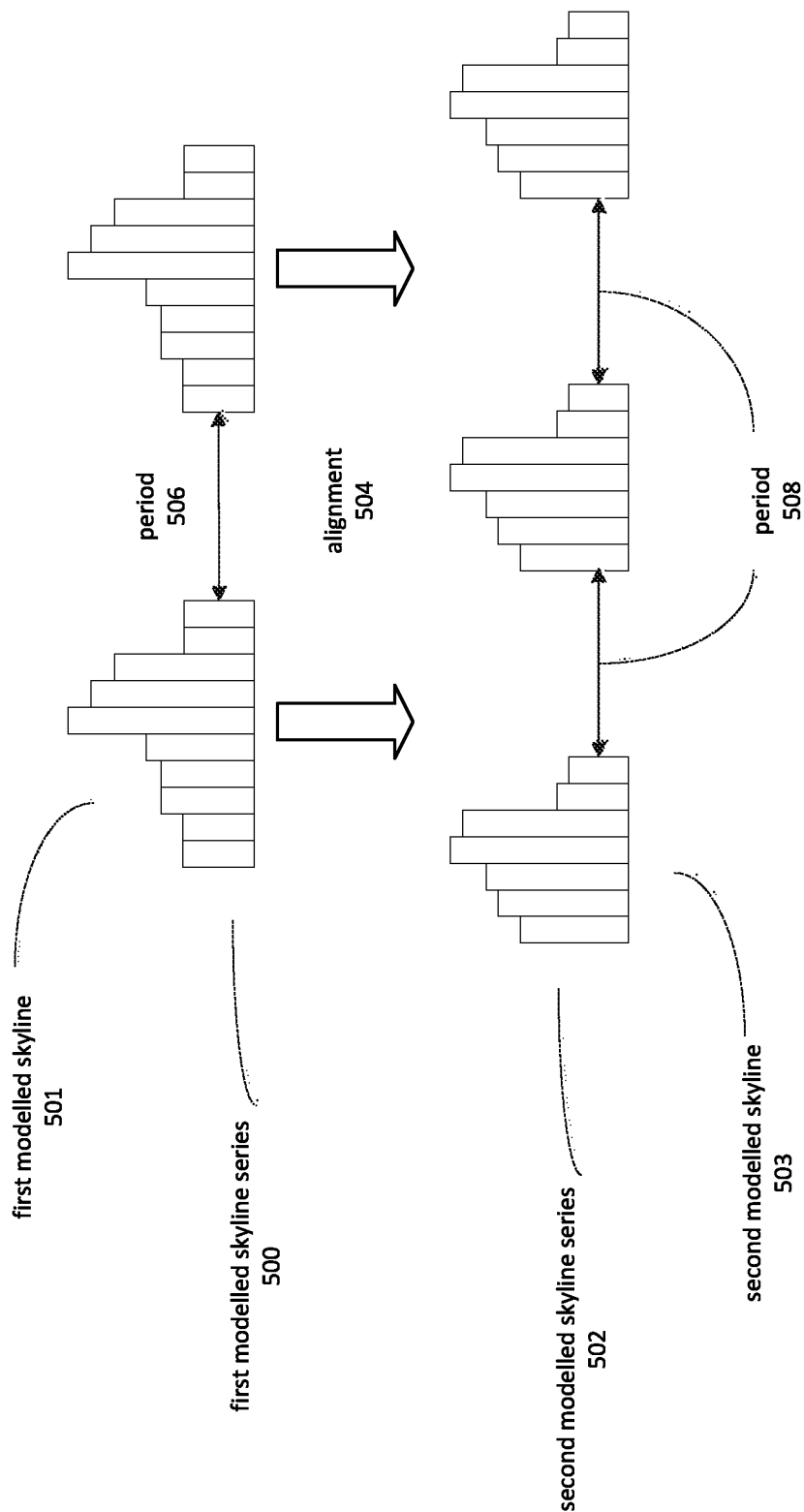
FIG. 5A depicts an example of aligning modelled skylines.

FIG. 5A depicts an example of aligning modelled skylines. A first modelled skyline series 500 may comprise representations of a first modelled skyline 501 repeated with period 506. A second modelled skyline series 502 may comprise a second modelled skyline 503 repeated with period 508. The two modelled skyline series 500, 502 may be aligned with each other, via an alignment 504 process, to minimize cost and risk of violating an SLA.

Figure 5B:
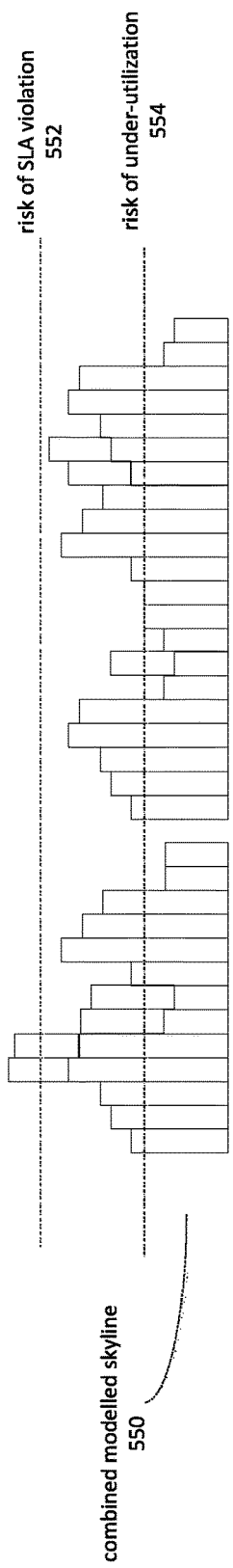
FIG. 5B depicts risks of SLA violations and risks of under-utilization.

FIG. 5B depicts risks of SLA violations and risks of under-utilization. In FIG. 5B, the modelled skyline series 500, 502 are depicted as a combined modelled skyline 550. The combined modelled skyline may represent, at each step or building, the summated cost utilizations of the aligned modelled skyline series 500, 502.

As depicted in FIG. 5B, the combined modelled skyline 550 is indicative, at certain steps, of either a risk of SLA violation 552 or a risk of under-utilization 554. The risk of SLA violation 552 may correspond to those steps where the summated costs of the combined modelled skylines 550 is above a threshold level. The risk of SLA violation 552 may, in some instances, be described as a risk of exceeding a time-to-finish constraint. A risk of under-utilization 554 may correspond to those steps where the summated resource-utilization costs of the combined modelled skylines 550 is below a threshold level. The risk of under-utilization 554 may be associated with an increased financial cost of executing a job, since it involves the risk of under-utilizing resources whose purchase, operation, and maintenance may incur financial costs.

Figure 6:
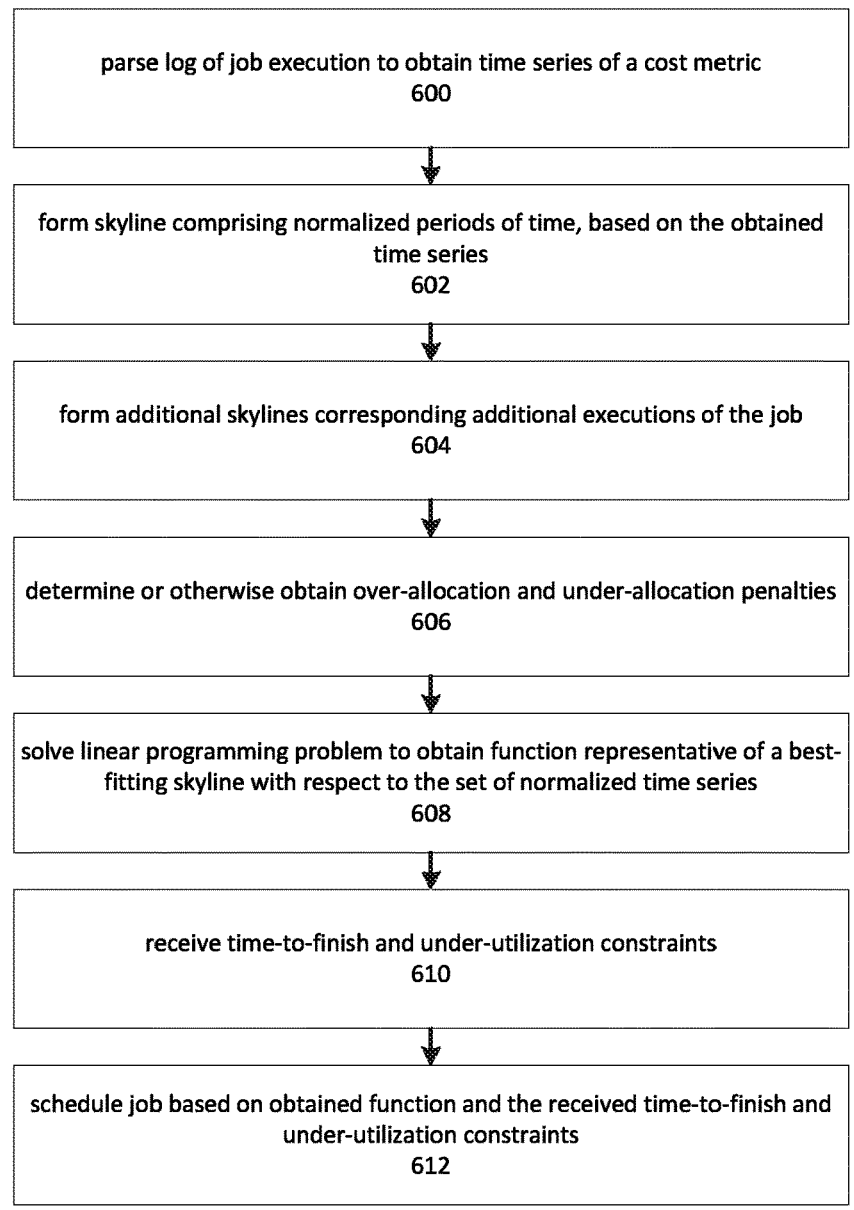
FIG. 6 depicts an example process for scheduling jobs using skyline-based models.

FIG. 6 depicts an example process for scheduling jobs using skyline-based models. Although FIG. 6 is depicted as a sequence of blocks, it will be appreciated that the depicted sequence should not be construed as limiting the scope of the present disclosure to embodiments that adhere to the depicted sequence. It will also be appreciated that, in some embodiments of the present disclosure, certain of the depicted blocks may be reordered, performed in parallel, or omitted.

Block 600 depicts parsing a log file collected during the execution of a job. As depicted in FIG. 1, a data acquisition module 101 may obtain a log that contains metrics collected during the periodic execution of a job. The metrics may pertain to a cost of executing the job, such as CPU utilization. The metrics may, moreover, be those whose usage is to be scheduled to avoid under-allocation or over-allocation. By parsing a log file, the data acquisition module 101 may then form a time series comprising metric values paired with time. For example, each point in the time series may comprise a timestamp and a metric value. In some cases, the time series extracted from the log may be irregularly spaced, such that the time interval between each point of the time series is not constant.

Block 602 depicts forming, from the initial version of the time series, a new version which is normalized with respect to starting time and time interval. Thus, while the initial version of the time series may start at arbitrary times and may be irregularly spaced, the normalized time series may be adjusted to refer to times relative to the beginning of the job's execution, such that the initial value occurs at time zero. Each step in the normalized time series may then refer to a uniform period of time, such as N seconds. The normalized time series may correspond to the skylines 212-216 that FIG. 2 depicts.

Block 604 depicts forming additional skylines corresponding to additional executions of the job. As noted, each skyline may be normalized to have a common, e.g. zero-based, start time and uniform time periods with respect to other skylines.

A skyline may use time periods that are uniform both with respect to the same job and with respect to other jobs. For example, each step of a skyline may represent 10 milliseconds of time, regardless of which job the skyline pertains to. Alternatively, skylines may be generated in units of time that are normalized with respect to jobs of the same type, but not normalized with respect to jobs of other types. In such cases, the skylines may be normalized to represent uniform time periods when being scheduled, e.g. during operation of the alignment module 126.

Block 606 depicts determining or otherwise obtaining over-allocation and under-allocation penalties that may be used in forming a modelled skyline. The penalties may, for example, be based on tolerance for SLA violations, risk of under utilization, financial considerations, and so forth.

Block 608 depicts forming a modelled skyline by solving a linear programming problem. The solution to the linear programming problem may permit formation of a step function which represents a modelled skyline function. The step function may represent a best-fitting skyline with respect to the collection of skylines obtained observationally. Constraints to the linear programming problem, or more generally to the best-fit determination, may involve application of the penalties for over-allocation and under-allocation.

The alignment module 126 may then schedule a job based on the modelled skyline. As depicted by block 610, this may comprise receiving time-to-finish constraints and under-utilization constraints which may govern placement of the job with respect to other jobs.

Block 612 depicts scheduling the job based on the step function and the constraints. The scheduling may be based on the alignment procedure described herein and depicted, for example, by FIGS. 5A and 5B.

The scheduling system described herein may be implemented in a variety of contexts where data pertaining to prior job executions is available and pertinent to the cost of executing a job. The scheduling system may also, in some instances, be adaptable to being seeded with an initial data set on which modelled time series may be based. Over time, a feedback mechanism may be employed to reform the modelled skylines as new data becomes available or as operating conditions change.

The scheduling system may, moreover, be adaptable to a variety of technical contexts in which periodic or repeating jobs are available. In one example, a distributed computing system may employ a scheduling module that distributes workload among the computing devices of the distributed system. In another example, a computing device may include a scheduling module that selects processors or other components for executing computing workload.

Figure 7:
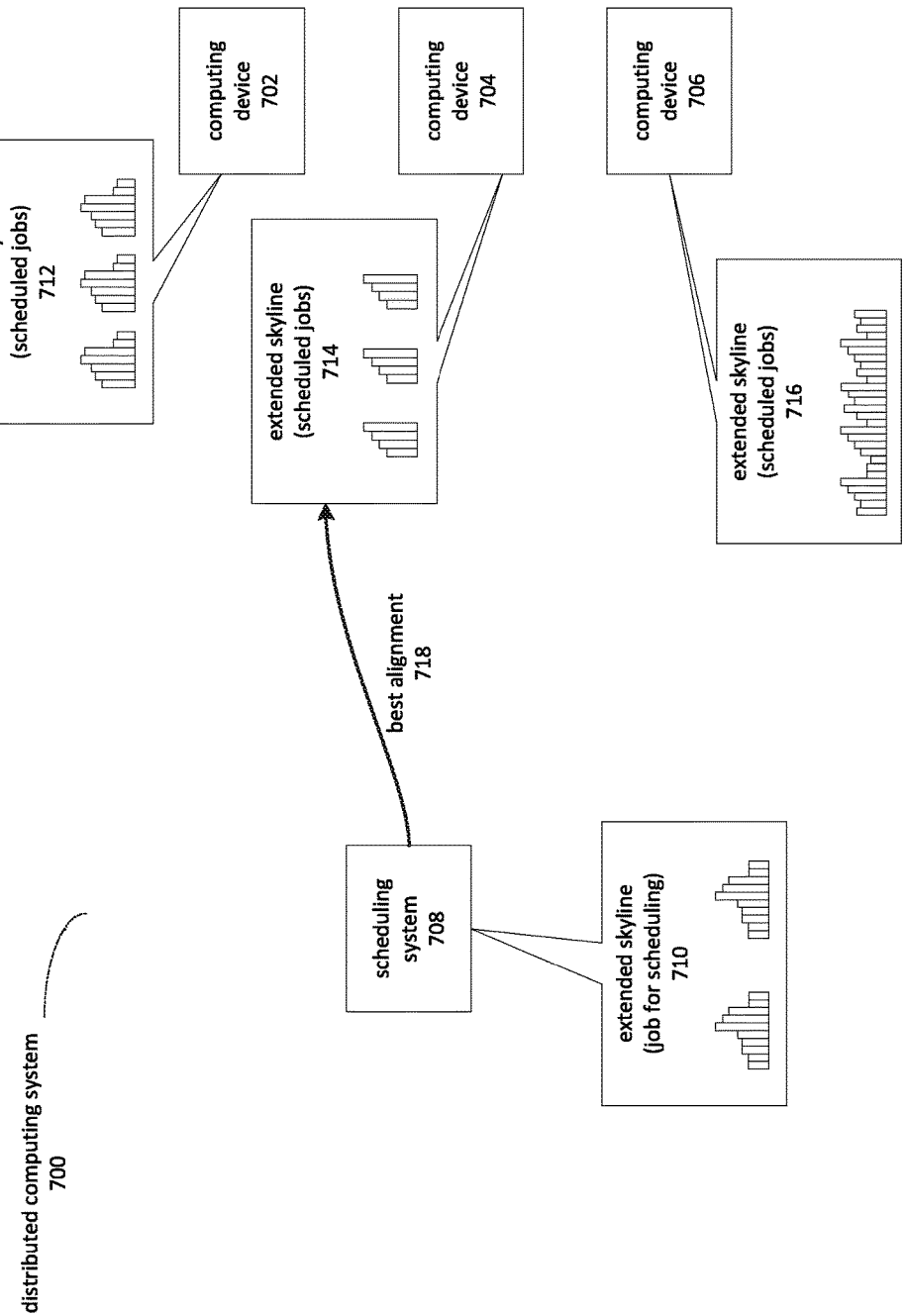
FIG. 7 depicts an example of a distributed computing system.

FIG. 7 depicts an example of a distributed computing system with a scheduling aspect. A distributed computing system 700 may comprise a plurality of computing devices 702-706. The distributed computing system 700 may further comprise a scheduling system 708. The scheduling system 708 may be, as depicted, a sub-system of the distributed computing system 700. The distributed computing system 700 may, for example, comprise the modules of the distributed computing system 100 that FIG. 1 depicts.

A job for scheduling may be assigned a location for execution by the scheduling system 708. Assigning the location may comprise operations including obtaining a modelled skyline corresponding to the job to be scheduled and projecting multiple recurrences of the modelled skyline to form a representation of an extended skyline 710 in which the job repeats periodically. The extended skyline 710 for the job to be scheduled may be represented in a manner similar to a skyline that corresponds to a single execution of the job. The representation may, for example, comprise a time series, step function, or staircase function.

The extended skylines 712-716 may also be associated with each of the computing devices 702-706 on which additional jobs are scheduled. The extended skylines 712-716 may represent repeated executions of additional jobs that have already been assigned, or that may be assigned, to execute on one of the computing devices 702-706.

The job for scheduling may be assigned, by the scheduling system 708, to execute on one of the computing devices 702-706 based on aligning extended skyline 710 of the job to be scheduled with each of the other extended skylines 712-716. The alignment 718 that best fits may be identified, and the computing device 712-716 that is associated with the best-fitting alignment may be selected for performing the job. Alternatively, permutations of alignments may be formed and then assigned to the computing devices 702-706, such that each of the computing devices 702-706 is assigned a number of jobs to execute periodically. In some cases, portions of a job may also be allocated to different computing devices. For example, a first portion of a job may be assigned to a first computing device and a second portion of the same job may be assigned to a second computing device. This type of allocation may, for example, be done when alignments for the two portions of the job are superior, in terms of time-to-finish constraints and under-utilization constraints, than an alignment of the entire job. Embodiments may obtain information indicative of portions of a job that may be executed individually, split the modelled timeline according to the information, and evaluate possible alignments of the two portions of the modelled timeline. The portions of the job may be treated as if they were independent jobs, potentially subject to ordering constraints. For example, there may be an order-of-execution constraint with respect to the two portions of the job.

Figure 8:
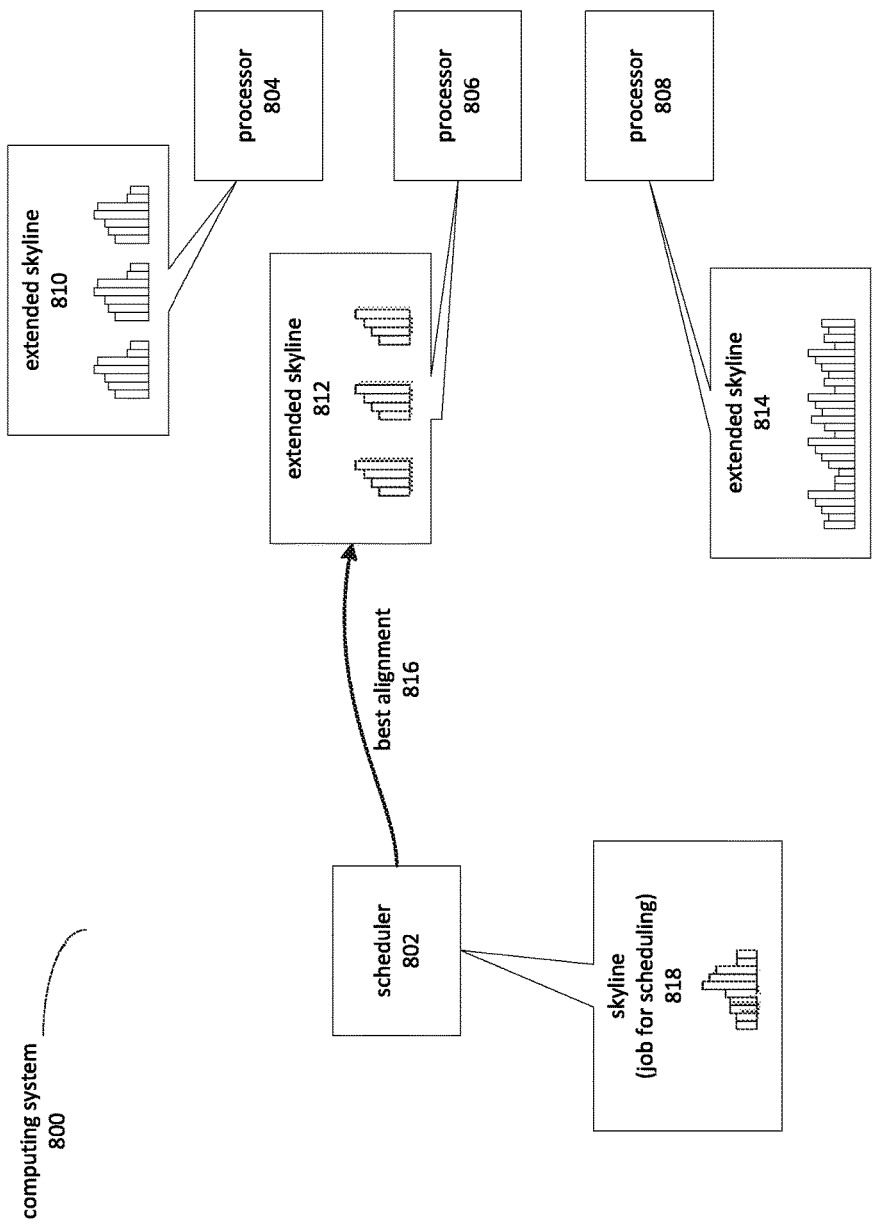
FIG. 8 depicts an example of processor scheduling on a computing system.

FIG. 8 depicts an example of processor scheduling on a computing system. Scheduling jobs on a computing system may comprise assigning jobs to processors for execution. In some cases, a job may correspond to a thread that, for a period of time, is to be executed on one of the processors 804-808 of the computing system 800. In other cases, the job may correspond to an interrupt, callback function, or other procedure or program that is to be executed on one of the processors 804-808.

The example of FIG. 8 depicts scheduling a single execution of a job. In the example of FIG. 8, a job for scheduling may be represented by a skyline 818. A best alignment 816 of the skyline 818 may be selected by aligning the skyline 818 with extended skylines 810-814 associated with the processors 804-808. The extended skylines 810-814 may represent predicted usage of the corresponding processor 804-808 prior to inclusion of the job that is to be scheduled. The best alignment 816 may be determined by identifying and evaluating possible alignments of the job's skyline 818 with each of the extended skylines 810-814, subject to time-to-finish and underutilization constraints as depicted, for example, in FIG. 3.

Figure 9:
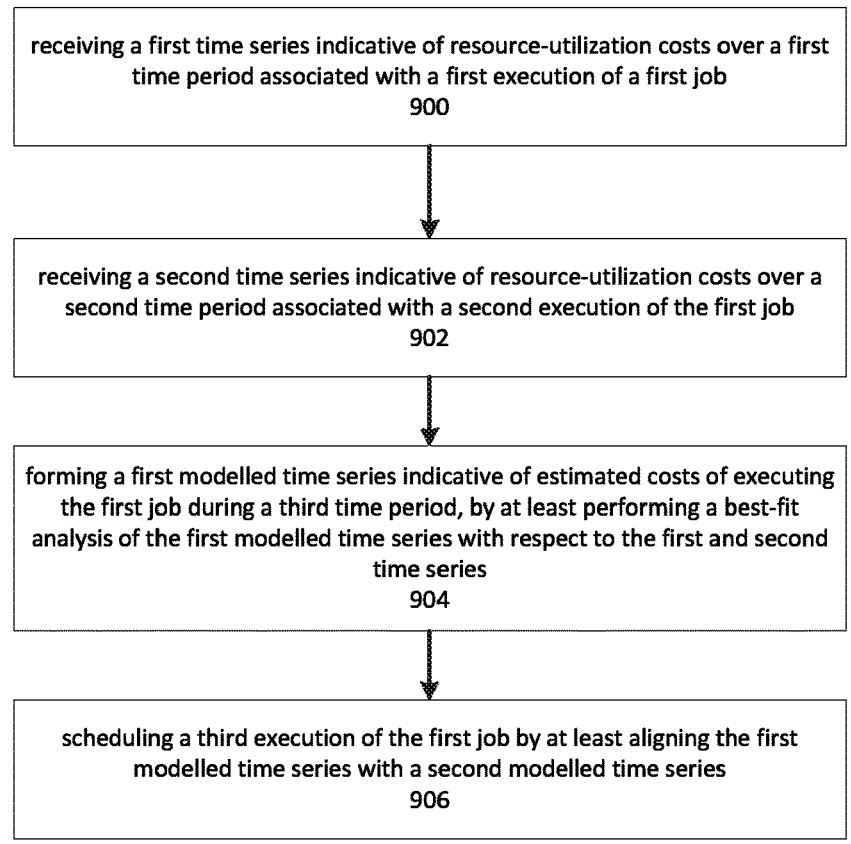
FIG. 9 depicts an example process for job scheduling using modelled skylines.

FIG. 9 depicts an example process of job scheduling using modelled skylines. Although FIG. 9 is depicted as a sequence of blocks, it will be appreciated that the depicted sequence should not be construed as limiting the scope of the present disclosure to embodiments that adhere to the depicted sequence. It will also be appreciated that, in some embodiments of the present disclosure, certain of the depicted blocks may be reordered, performed in parallel, or omitted.

The operations depicted by FIG. 9 may be performed, in various embodiments, by a computing device. In some instances, a computing device may comprise elements of the scheduling system depicted in FIG. 1. The scheduling system may, for example, be operative on a node of a distributed computing system to assign jobs for execution on one or more other nodes of the distributed computing system. The scheduling system may, in another example, comprise a module operative on a computing device to assign jobs for execution on processors of the computing device.

Block 900 depicts receiving a first time series indicative of resource-utilization costs over a first time period associated with a first execution of a first job. Similarly, block 902 depicts receiving a second time series indicative of resource-utilization costs over a second time period associated with a second execution of the first job. The time series may be received by a data acquisition process. For example, various application programming interface ("API") and operating system facilities exist for obtaining metrics such as CPU utilization, network utilization, and so on. These facilities may be utilized by a job scheduler or other module that may initiate executing of a job and collect information while the job is executing.

Block 904 depicts forming a first modelled time series indicative of estimated costs of executing the first job during a third time period, the determining based at least in part by performing a best-fit analysis of the first modelled time series with respect to at least the first time series and the second time series.

Block 906 depicts scheduling a third execution of the first job by at least aligning the first modelled time series with a second modelled time series indicative of resource-utilization costs of executing a second job. The second modelled time series may, in some instances, correspond to a projection of periodic executions of the second job, and in some cases additional jobs, that have already been or may be scheduled to execute on the selected computing device.

In a further aspect of the example process depicted by FIG. 9, the example process may comprise determining a step function indicative of the first modelled time series, where the step function may be determined by minimizing penalties for over-allocation and under-allocation of resource-utilization costs to the first modelled time series.

A further aspect of the example process may comprise calculating the first modelled time series by solving a linear programming problem governed by a parameter indicative of a penalty for at least one of over-allocation or under-allocation.

A further aspect of the example process may comprise normalizing the first time series and the second time series with respect to a common starting time and lengths of time between points of the first and second time series.

In a further aspect of the example process, each value in the first time series may correspond to a value indicative of at least one of processor utilization, storage input/output utilization, network utilization, and memory utilization.

A further aspect of the example process may comprise determining a period of time after which to recalculate the first modelled time series, the period of time based at least in part on a rate of change of a cost of executing the first job.

In a further aspect of the example process, the aligning may comprise determining, for a subset of the time period represented by the first modelled time series, a total cost of performing the first job and the second job. The aligning may, in further aspects of the example process, comprise minimizing penalties associated with at least one of risk of violating a time-to-finish constraint or a risk of under-utilization constraint.

Figure 10:
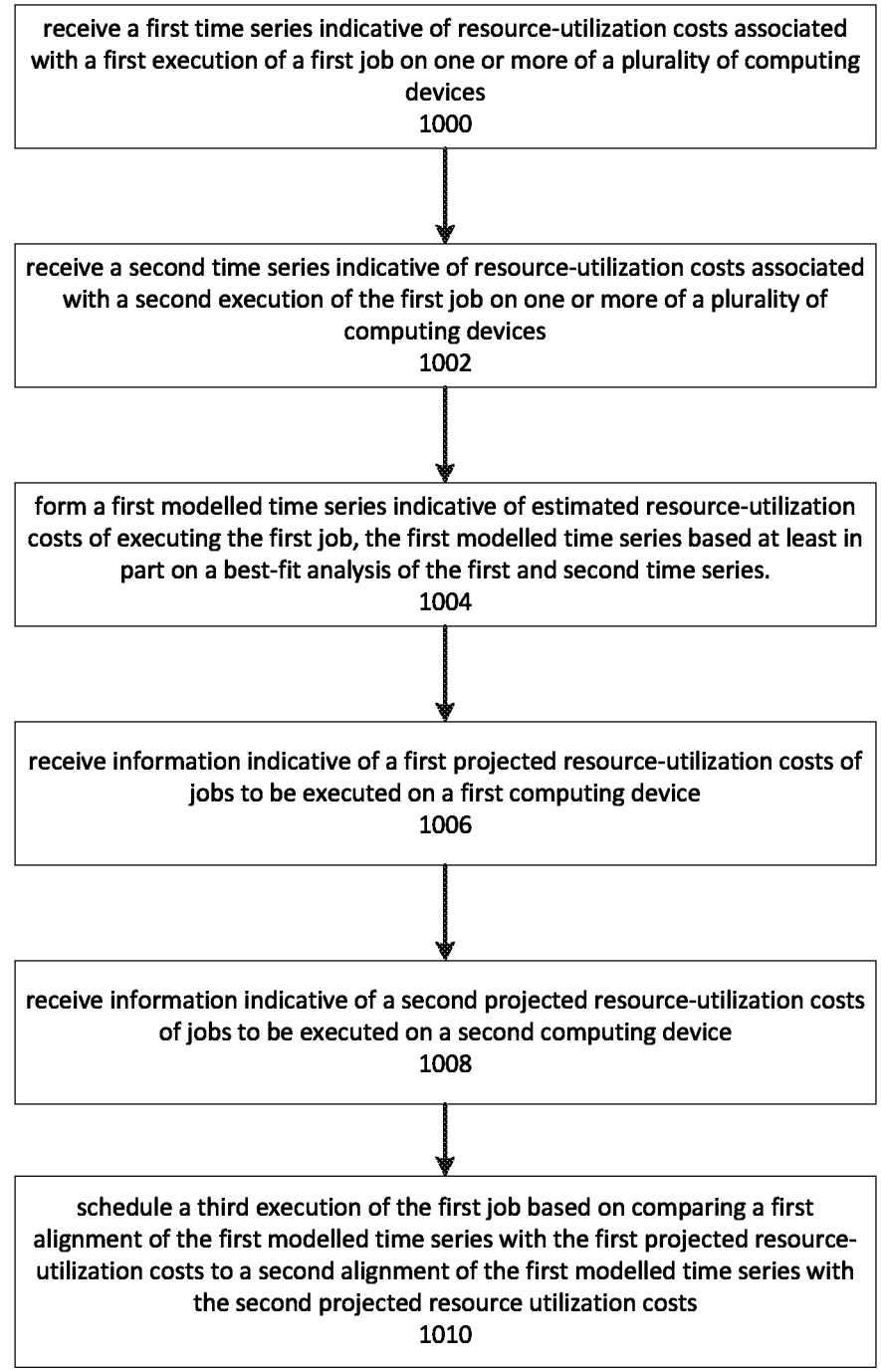
FIG. 10 depicts an example process for job scheduling in a distributed computing system.

FIG. 10 depicts an example process of job scheduling in a distributed computing system. Although FIG. 10 is depicted as a sequence of blocks, it will be appreciated that the depicted sequence should not be construed as limiting the scope of the present disclosure to embodiments that adhere to the depicted sequence. It will also be appreciated that, in some embodiments of the present disclosure, certain of the depicted blocks may be reordered, performed in parallel, or omitted.

The operations depicted by block 1000 may, in some instances, be performed by a scheduling system that is in communication with a plurality of computing devices. FIG. 7, for example, depicts a distributed computing system 700 in which comprising a scheduling system 708 that is in communication with a plurality of computing devices 702-706.

Blocks 1000 and 1002 depict receiving a first time series indicative of resource-utilization associated with a first execution of a first job on one or more of a plurality of computing devices, and a second time series associated with a second execution of the first job.

Block 1004 depicts forming a first modelled time series indicative of a predicted resource-utilization cost of executing the first job, the first modelled time series based on a best-fit analysis of the first modelled time series with respect to at least the first time series and the second time series.

Blocks 1006 and 1008 depict receiving information indicative of a first projected resource-utilization costs of jobs to be executed on a first computing device of the plurality of computing devices, and receiving similar information pertaining to a second projected resource-utilization costs for jobs to be executed on a second computing device.

Block 1010 depicts scheduling a third execution of the first job based at least in part on comparing a first alignment of the first modelled time series with the first projected resource-utilization costs to a second alignment of the first modelled time series with the second projected resource-utilization costs.

In a further aspect of the example process depicted by FIG. 10, the first job may be scheduled on the first computing device in response to determining that the first alignment is associated with a reduced risk of violating a time-to-finish constraint compared to the second alignment. The risk of violating the time-to-finish constraint may be determined based at least in part on calculating a penalty for over-allocating total resource-utilization costs during a portion of the time represented by the first alignment.

A further aspect of the example process may comprise splitting the first modelled time series into a first portion and a second portion. The split portions may then be scheduled on different computing devices when this would result in a more favorable alignment than when scheduling the entire job on a single computing device. For example, the example process may comprise scheduling a first portion of an execution of the first job on a first computing node when an alignment of the first portion of the modelled time series, with the projected resource-utilization costs of a first computing device, results in a more favorable alignment than scheduling the first job only on the first computing device or the second computing device. The alignment of the first portion of the modelled time series may, for example, be indicative of reduced risk of exceeding at least one of a time-to-finish constraint or an under-utilization constraint, compared to the alignments of the entire modelled time series on the first and second computing devices.

A further aspect of the example process may comprise determining a period of time for re-forming the first modelled time series. The period between re-forming may be based at least in part on a rate of change of a cost of executing the first job on the first computing device.

A further aspect of the example process may comprise receiving information for tuning the modelling and alignment operations. For example, the distributed computing service may receive, from an administrative client application or other interface, information which describes time-to-finish constraints, under-utilization constraints, and so forth. In one aspect, the example process may comprise receiving information indicative of a permitted level of risk of exceeding a time-to-finish constraint and/or a permitted level of risk of under-utilization. In another aspect, the example process may comprise receiving information indicative of a maximum cost of executing the first job.

A further aspect of the example process may comprise monitoring deviation between the first modelled time series and an additional time series indicative of resource-utilization associated with an execution of the first job. Based on this information, the first modelled time series may be adjusted or re-formed. In some instances, excessive deviation may trigger a re-forming of the modelled time series.

Figure 11:
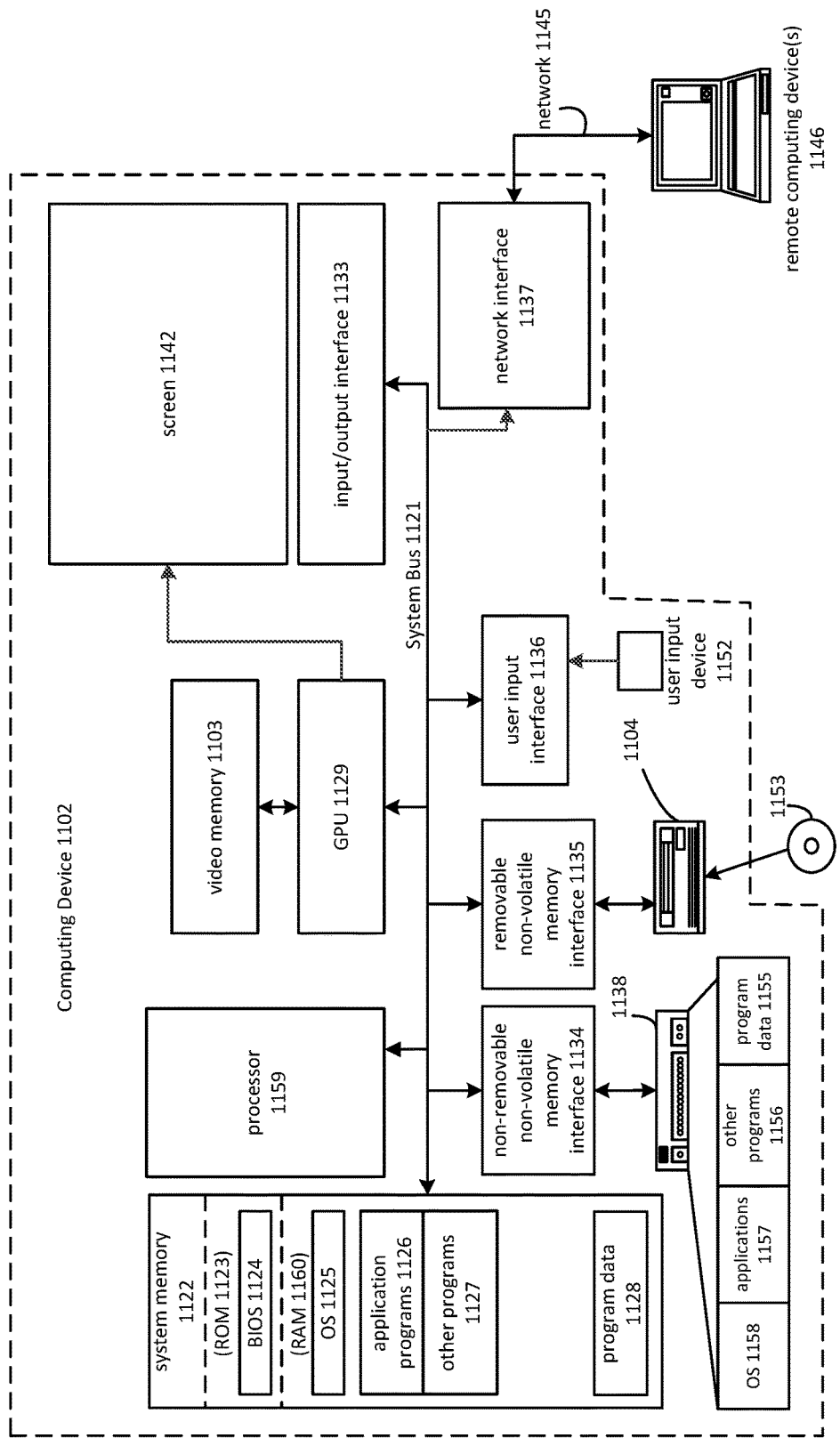
FIG. 11 depicts an example general purpose computing environment in which in which the techniques described herein may be embodied.

Aspects of the present disclosure may be implemented on one or more computing devices or environments. FIG. 11 depicts an example computing environment in which in which some of the techniques described herein may be embodied. The computing device 1102 is only one example of a suitable computing environment and is not intended to suggest any limitation as to the scope of use or functionality of the presently disclosed subject matter. Neither should the depiction of the computing environment be interpreted as implying any dependency or requirement relating to any one or combination of components illustrated in the example computing device 1102. In some embodiments the various depicted computing elements may include circuitry configured to instantiate specific aspects of the present disclosure. For example, the term circuitry used in the disclosure can include specialized hardware components configured to perform function(s) by firmware or switches. In other example embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing device 1102, which may include any of a mobile device, smart phone, tablet, laptop, desktop computer, etc., typically includes a variety of computer-readable media. Computer-readable media can be any available media that can be accessed by computing device 1102 and may include both volatile and nonvolatile media, removable and non-removable media. Media and computer readable media are physical mediums and as such do not include propagating signals per se or transitory signals per se.

The system memory 1122 includes computer-readable storage media in the form of memory such as read only memory ("ROM") 1123 and random access memory ("RAM") 1160. The RAM memory 1160 may include volatile memory modules, such as dual in-line memory modules ("DIMMs"). The RAM 1160 portion of system memory 1122 may sometimes be referred to as main memory. RAM 1160 typically contains data and/or program modules that are immediately accessible to and/or presently being operated on by processor 1159. By way of example, and not limitation, FIG. 11 illustrates operating system 1125, application programs 1126, other program modules 1127, and program data 1128.

The processor 1159 typically contains at least one primary processing unit, sometimes referred to as a core, and at least one system agent, sometimes referred to as an uncore. The core of the processor 1159 typically executes computer-executable instructions while the uncore performs related tasks which may include overseeing memory transfers and maintaining a processor cache. The uncore may comprise a memory controller for interfacing between cores of the processor 1159 and system memory 1122.

A basic input/output system 1124 ("BIOS"), containing the basic routines that help to transfer information between elements within computing device 1102, such as during start-up, is typically stored in ROM 1123. The BIOS 1124 may be replaced, in various embodiments, by other firmware.

The computing device 1102 may also include non-volatile storage devices. By way of example only, FIG. 11 illustrates a hard disk drive 1138 that reads from or writes to non-removable, non-volatile magnetic media, and an optical disk drive 1114 that reads from or writes to a removable, non-volatile optical disk 1153 such as a CD ROM or other optical media. Other non-volatile storage devices that can be used in the example operating environment include, but are not limited to, flash memory, digital versatile disks, solid state disk drives, and the like. The hard disk drive 1138 is typically connected to the system bus 1121 through an non-removable memory interface such as interface 1134, and optical disk drive 1104 is typically connected to the system bus 1121 by a removable memory interface, such as interface 1135.

The drives and their associated computer storage media discussed above and illustrated in FIG. 11, provide storage of computer-readable instructions, data structures, program modules and other data for the computing device 1102. In FIG. 11, for example, hard disk drive 1138 is illustrated as storing instructions of the operating system 1158, application programs 1157, other program modules 1156, and program data 1155. Note that these components can either be the same as or different from operating system 1125, application programs 1126, other program modules 1127, and program data 1128. Operating system 1158, application programs 1157, other program modules 1156, and program data 1155 are given different numbers here to illustrate that, at a minimum, they are different copies. A user may enter commands and information into the computing device 1102 through a user input device 1152. The user interface device 1152 may include, but is not limited to, keyboards, touchpads, computer mice, trackballs, and so forth. Other input devices, also not shown, may include a microphone, joystick, game pad, satellite dish, scanner, or the like. These and other input devices are often connected to the processing unit 1159 through a user input interface 1136 that is coupled to the system bus, but may be connected by other interface and bus structures, such as a parallel port, game port or a universal serial bus (USB). A screen 1142 or other type of display device is also connected via GPU 1129, although in some instances the screen 1142 may be driven through the system bus 1121 or another interface. In addition to the monitor, computers may also include other peripheral input/output devices such as speakers, printers, and so forth which may be connected through an input/output interface 1133.

The computing device 1102 may operate in a networked environment using logical connections to one or more remote computers, such as a remote computer 1146. The remote computer 1146 may be a personal computer, a server, a router, a network PC, a peer device or other compute node, and typically includes many or all of the elements described above relative to the computing device 1102. The connections depicted in FIG. 11 include a network 1145, which may include local-area, wide-area, cellular, and mesh networks, or other types of networks.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Each of the processes, methods and algorithms described herein may be embodied in, and fully or partially automated by, modules comprising computer executable instructions loaded into memory and executed by one or more processors of a computing device. The processes and algorithms may also be implemented wholly or partially in application-specific circuitry. The results of the disclosed processes and process steps may be stored, persistently or otherwise, in any type of computer storage device such as, e.g., volatile or non-volatile storage. Volatile and non-volatile storage, as used herein, excludes propagating or transitory signals per se.

The various features and processes described herein may be used independently of one another, or may be combined in various ways. All possible combinations and subcombinations are intended to fall within the scope of this disclosure. In addition, certain elements of the processes, methods, and algorithms may be omitted in some implementations. The methods and processes described herein are also not limited to any particular sequence, and the depictions comprising blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

The embodiments presented herein are so presented by way of example, and are not intended to limit the scope of the present disclosure. Thus, nothing in the foregoing description is intended to imply that any particular feature, characteristic, step, module or block is required, necessary, or indispensable. The methods and systems described herein may be embodied in a variety of forms. Various omissions, substitutions and changes in the form of the methods and systems described herein may be made without departing from the spirit of what is disclosed herein. The accompanying claims and their equivalents are intended to cover such forms or modifications as would fall within the scope and spirit of certain embodiments disclosed herein.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed:

1. A system for scheduling a set of tasks over a plurality of computing devices, the system comprising:
one or more processors; and
one or more memories having stored thereon computer readable instructions that, when executed by the one or more processors, cause the system to at least:
for each task of the set of tasks,
receive at least two time series in which each time series thereof is indicative of resource utilization costs associated with execution of an instance of that task by a computing device of the plurality of computing devices, and
identify a resource utilization model for that task based at least in part on a best-fit analysis of the at least two time series, to obtain a set of resource utilization models for the set of tasks;
for a workload of the set of tasks, identify a schedule for executing the set of tasks based on the resource utilization models and a selected one or more of an over-utilization constraint and an under-utilization constraint, wherein the schedule for executing the set of tasks maintains a resource utilization efficiency of executing the set of tasks of the workload within the selected one or more of the over-utilization constraint and the under-utilization constraint; and
configure one or more computing devices of the plurality of computing devices to execute the set of tasks in accordance with the schedule for the workload.

2. The system of claim 1, wherein identifying the schedule further comprises: determining that the schedule further reduces a risk of violating a time-to-finish constraint compared to a second schedule.

3. The system of claim 1, further comprising instructions executable to:
calculating a penalty for over-allocating the total resource utilization costs during a portion of time represented by the schedule.

4. The system of claim 1, further comprising instructions executable to:
for a first time series of the at least two time series, split the first time series into a first portion of the first time series and a second portion of the first time series; and
schedule a first portion of the workload based at least in part on an alignment of the first portion of the first time series with the resource utilization models.

5. The system of claim 4, wherein scheduling the first portion of the workload further comprises: reducing a risk of exceeding at least one of a time-to-finish constraint or the under-utilization constraint, compared to a second schedule.

6. The system of claim 1, further comprising instructions executable to: determine a step function fitting a first time series of the at least two time series, based at least in part on assigning penalties for at least one of over-allocation or under-allocation.

7. The system of claim 1, further comprising instructions executable to: determine a period of time for reevaluating the at least two time series, the period of time based at least in part on a rate of change of a cost of executing the schedule for the workload on the computing device of the plurality of computing devices.

8. A method of scheduling a set of tasks over a plurality of computing devices, the method comprising:
for each task of the set of tasks,
receiving at least two time series in which each time series thereof is indicative of resource utilization costs associated with execution of an instance of that task by a computing device of the plurality of computing devices, and
identifying a resource utilization model for that task based on a best-fit analysis of the at least two time series to obtain a set of resource utilization models for the set of tasks;
for a workload of the set of tasks, identifying a schedule for executing the set of tasks based on the resource utilization models and a selected one or more of an over-utilization constraint and an under-utilization constraint, wherein the schedule for executing the set of tasks maintains a resource utilization efficiency of executing the set of tasks of the workload within the selected one or more of the over-utilization constraint and the under-utilization constraint; and
configuring one or more computing devices of the plurality of computing devices to execute the set of tasks in accordance with the schedule for the workload.

9. The method of claim 8, wherein identifying the schedule further comprises:

determining that the schedule further reduces a risk of violating a time-to-finish constraint compared to a second schedule.

10. The method of claim 8, further comprising:
for a first time series of the at least two time series, splitting the first time series into a first portion of the first time series and a second portion of the first time series; and
aligning the first portion of the first time series with the resource utilization models.

11. The method of claim 8, further comprising: determining a step function fitting a first time series of the at least two the time series, based at least in part on assigning penalties for at least one of over-allocation or under-allocation.

12. The method of claim 8, further comprising: forming the at least two time series based at least in part on a solution to a linear programming problem governed by the selected one or more of the over-utilization constraint and the under-utilization constraint.

13. The method of claim 8, further comprising: receiving information indicative of at least one of a permitted level of risk of exceeding a time-to-finish constraint and a permitted level of risk of under-utilization.

14. The method of claim 8, further comprising: receiving information indicative of a maximum cost of executing the workload.

15. The method of claim 8, wherein the resource utilization models are based at least in part on a prediction of the resource utilization models of executing the workload.

16. A non-volatile computer-readable storage medium having stored thereon computer-executable instructions that, when executed by a computing device, cause the computing device to schedule a set of tasks over a plurality of computing devices by:
for each task of the set of tasks,
receive at least two time series in which each time series thereof is indicative of resource utilization costs associated with execution of an instance of that task by a computing device of the plurality of computing devices, and
identify a resource utilization model for that task based on a best-fit analysis of the at least two time series, to obtain a set of resource utilization models for the set of tasks;
for a workload of the set of tasks, identify a schedule for executing the set of tasks based on the resource utilization models and a selected one or more of an over-utilization constraint and an under-utilization constraint, wherein the schedule for executing the set of tasks maintains a resource utilization efficiency of executing the set of tasks of the workload within the selected one or more of the over-utilization constraint and the under-utilization constraint; and
configure one or more computing devices of the plurality of computing devices to execute the set of tasks in accordance with the schedule for the workload.

17. The non-volatile computer-readable storage medium of claim 16, wherein identifying the schedule further comprises: determining that the schedule reduces a risk of violating a time-to-finish constraint compared to a second schedule.

18. The non-volatile computer-readable storage medium of claim 16, further comprising executable to: determine a step function fitting a first time series of the at least two time series, based at least in part on assigning penalties for at least one of over-allocation or under-allocation.

19. The non-volatile computer-readable storage medium of claim 16, further comprising instructions executable to:
form the at least two time series based at least in part on a solution to a linear programming problem governed by the selected one or more of the over-utilization constraint and the under-utilization constraint.

20. The non-volatile computer-readable storage medium of claim 16, further comprising instructions executable to:
detect a deviation between a first time series of the at least two time series and an additional time series during execution of the workload; and
adjust the resource utilization models based at least in part on the deviation.

\* \* \* \* \*